United States Patent
Watkins

(10) Patent No.: US 6,517,112 B1
(45) Date of Patent: Feb. 11, 2003

(54) COMBINED TRAILER CRANK AND LOCKING MECHANISM

(76) Inventor: Gerald Watkins, 9541 W. Farm Rd., #156, Republic, MO (US) 65738

( * ) Notice: Subject to any disclaimer, the term of this patent is extended or adjusted under 35 U.S.C. 154(b) by 0 days.

(21) Appl. No.: 09/711,674

(22) Filed: Nov. 13, 2000

Related U.S. Application Data

(60) Provisional application No. 60/165,001, filed on Nov. 12, 1999.

(51) Int. Cl.$^7$ .................................................. B60S 9/02
(52) U.S. Cl. ................................ 280/763.1; 280/766.1; 280/475; 254/418; 254/420
(58) Field of Search ........................... 280/763.1, 766.1, 280/475, 477, 763, 765; 74/342, 343; 248/352, 650; 254/418, 419, 420, 423, 424

(56) References Cited

U.S. PATENT DOCUMENTS

| | | | | |
|---|---|---|---|---|
| 2,499,625 A | * | 3/1950 | Black | 254/419 |
| 3,269,331 A | * | 8/1966 | Thompson | 280/766.1 |
| 3,807,756 A | * | 4/1974 | Glassmeyer | 280/766.1 |
| 3,976,310 A | * | 8/1976 | Carr | 280/766.1 |
| 4,000,924 A | * | 1/1977 | Blassingame | 280/766.1 |
| 4,424,983 A | * | 1/1984 | Walters | 280/763.1 |
| 5,470,167 A | * | 11/1995 | Benckert et al. | 280/766.1 |
| 5,538,225 A | * | 7/1996 | VanDenberg | 280/763.1 |
| 5,904,342 A | * | 5/1999 | Laarman | 254/419 |
| 5,984,353 A | * | 11/1999 | Rasmussen | 280/766.1 |

* cited by examiner

*Primary Examiner*—Brian L. Johnson
*Assistant Examiner*—Hau Phan
(74) *Attorney, Agent, or Firm*—Shook, Hardy & Bacon L.L.P

(57) ABSTRACT

A combination trailer crank and locking mechanism. The device includes a crank portion having a handle portion separated from a coupler portion by a generally S-shaped body portion. When the coupler portion of the device is coupled with a rotatable shaft of a retractable leg assembly of a trailer, the crank portion facilitates the raising and lowering of the trailer's legs. The device also includes a locking portion which is connected to the crank portion in a transverse orientation. When the device is connected to the rotatable shaft of the trailer by the locking portion, the crank portion will abut an underneath side of the trailer and prevent rotation of the rotatable shaft, thereby preventing a person from being able to raise and lower the retractable legs of the trailer.

6 Claims, 2 Drawing Sheets

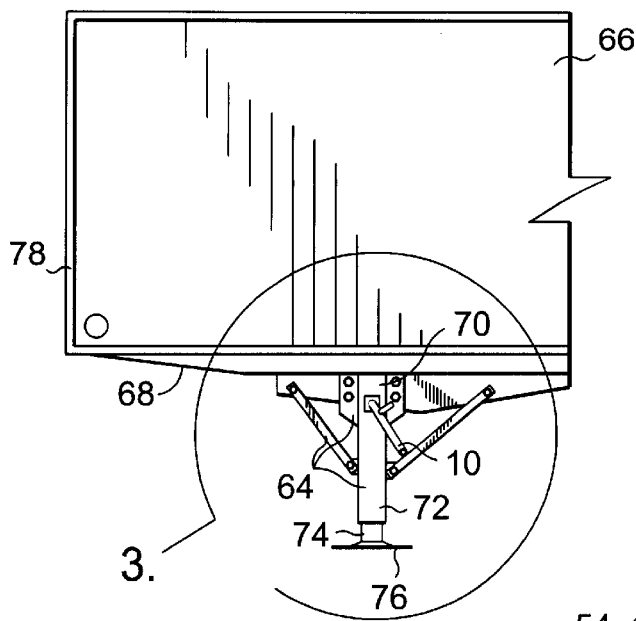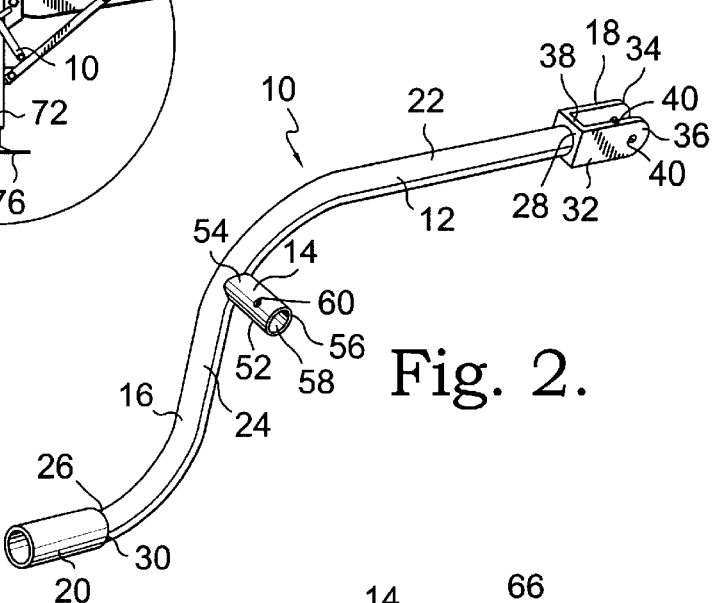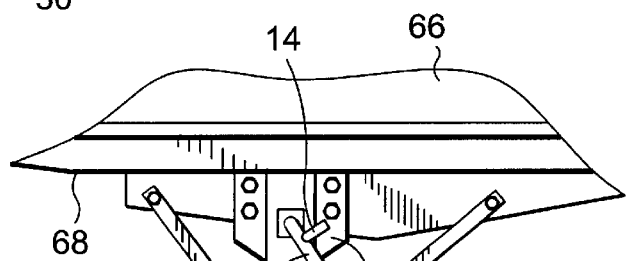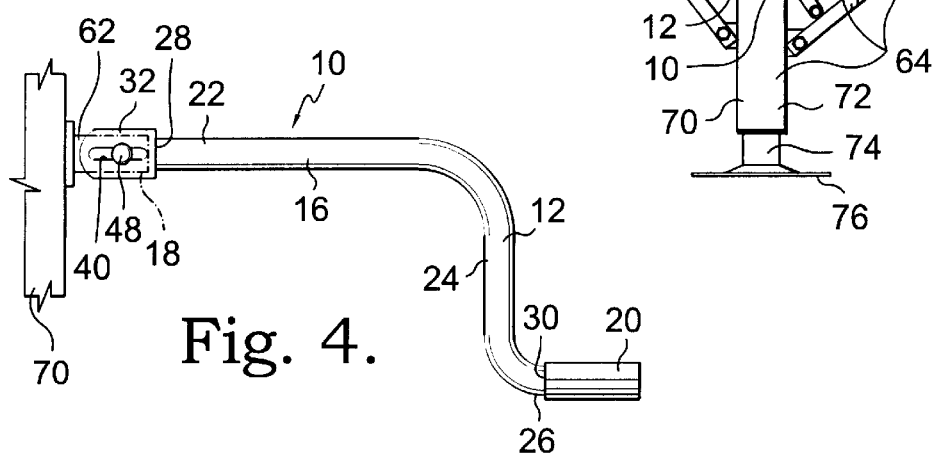

COMBINED TRAILER CRANK AND LOCKING MECHANISM

CROSS-REFERENCE TO RELATED APPLICATIONS

This application claims the benefit under 35 U.S.C. §119 (e) of provisional application No. 60/165,001, filed Nov. 12, 1999, bearing the same title.

STATEMENT REGARDING FEDERALLY SPONSORED RESEARCH OR DEVELOPMENT

Not Applicable.

BACKGROUND OF THE INVENTION

The present invention relates to a device for raising and lowering retractable support legs of a semitrailer as well as preventing the raising and lowering of the retractable legs of a semitrailer. More particularly, this invention relates to a combination trailer crank and locking mechanism.

Semi-trucks and trailers or tractor trailer rigs for over the road trucking to haul cargo are well known. These units generally include a truck which is selectively coupleable to a trailer. The trailer generally has wheels at a rear end and is coupled with a rear end of the truck at a forward end. The trailer generally has retractable legs located near the forward end to support the forward end of the trailer when it is not coupled with the truck.

As is well known in the art, the retractable legs can be raised or lowered by rotating a rotatable shaft in the leg assembly, thereby raising or lowering the forward end of the trailer. The rotatable shaft is usually turned by a generally S-shaped hand crank. In use, the user can raise the front end of the trailer by extending the legs and thereby permit the user to back the rear end of the truck underneath the front end of the trailer to facilitate coupling. When the trailer is coupled with the truck and being pulled, the legs are generally in a fully retracted position. When the user wants to uncouple the trailer from the truck, the user can then raise the front end of the trailer up and uncouple the truck.

Because of the nature of over the road trucking, it is often necessary for truckers to leave uncoupled trailers in public places, such as truck stops and weigh stations. While the trailers are locked to prevent theft of the contents of the trailer, the entire trailer themselves are often stolen. Once the trailers are out of public areas, the thieves can take their time in breaking into the trailers. Additionally, apart from the value of the contents of the trailer, the trailers themselves are quite valuable. When these unhooked trailers are left in public places, there is nothing to prevent thieves with their own trucks from raising the trailer up, coupling it with their truck and driving off.

Therefore, there is a need for a device which prevents the raising and lowering of the retractable legs of a semitrailer. Additionally, there is need for such a device which is inexpensive to make, compact, and easy to use. The present invention overcomes the drawbacks of the prior art and fills these and other needs.

BRIEF SUMMARY OF THE INVENTION

In order to overcome the above-stated problems and limitations, and to achieve the noted objects, there is provided a combination trailer crank and locking mechanism. In general, the device includes a trailer crank or crank portion having a locking portion extending therefrom. The crank portion has a coupler portion separated from a handle portion by a body portion. The body portion is generally S-shaped and permits the crank portion to be used as a hand crank when the coupler portion is coupled with the rotatable shaft of the trailer.

The locking portion generally extends outwardly from a side of the crank portion and is preferably a short tubular member with a transverse bore. When it is desirable to use the device as a locking mechanism, the locking portion is received on the rotatable shaft of the trailer portion. In this orientation, the crank portion is generally parallel to a longitudinal axis of the trailer. A pin which couples the device to the rotatable shaft is provided with a padlock type body on one end to prevent the pin from being removed from the coupling arrangement.

When the device is coupled with the trailer in the locking arrangement, the ends of the crank portion prevent rotation of the rotatable shaft for very far by abutting the underneath side of the trailer. In this arrangement, a would-be thief cannot rotate the rotatable shaft the multiple number of times necessary to raise and lower the front end of the trailer the amount required to facilitate coupling and uncoupling of the trailer to a truck. Additionally, the would-be thief does not have access to and cannot gain access to the end of the rotatable shaft to attach their own crank because the padlock type pin securely locks the device onto the end of the rotatable shaft. Accordingly, because the would-be thief cannot raise and lower the front end of the trailer, the trailer cannot be coupled with a truck and can therefore not be stolen. Additionally, the user can, apart from using the device to lock the retractable legs of the trailer in a set position, use the same device to facilitate the raising and lowering of the trailer. Accordingly, the present device provides an economical, compact, easy to use and sturdy means of preventing the theft of trailers.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWING

The objects and features of the invention noted above are explained in more detail with reference to the drawing, in which like reference numerals denote like elements, and in which:

FIG. 1 is a side view of the combination crank and locking mechanism of the present invention in use on a trailer in the cranking position;

FIG. 2 is a perspective view of the combination crank and locking mechanism of the present invention;

FIG. 3 is an enlarged view of the combined trailer crank and locking mechanism of the present invention taken generally around the area of numeral 3 in FIG. 1;

FIG. 4 is a side view of the combined trailer crank and locking mechanism of the present invention coupled with the trailer in the cranking position;

DETAILED DESCRIPTION OF THE INVENTION

Figure 5:
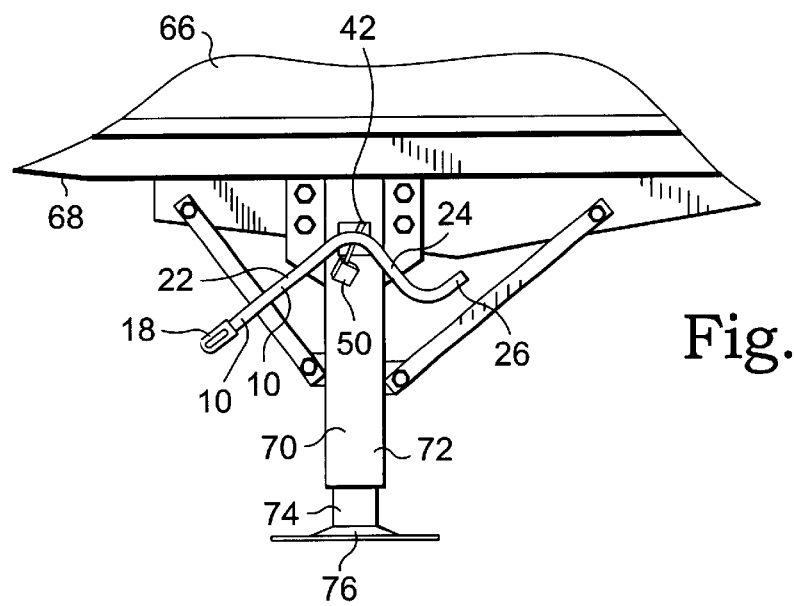
FIG. 5 is a side view of the combination trailer crank and locking mechanism of the present invention attached to the trailer in the locking position.

Referring now to the drawing in detail, and initially to FIG. 2, numeral 10 generally designates the combined trailer crank and locking mechanism device of the present invention. The device 10 has a crank portion 12 and a locking portion 14.

The crank portion 12 includes a body portion 16, a coupler portion 18, and a handle portion 20. The body portion 16 has a first section 22, a second section 24, and a third section 26. The body portion 16 also includes a first end 28 and a second end 30. The body portion 16 is preferably an elongate cylindrical member and has been illustrated as a bent tube or pipe. The first section 22 and the third section 26 of the body portion 16 are preferably straight and are generally parallel to each other. The second section 24 connects the first section 22 to the third section 26 and has a generally S-shaped configuration.

The coupler portion 18 is located adjacent the first end 28 of the body portion 16 and preferably includes a clevis or a U-shaped member 32. The clevis 32 preferably has a first leg 34 and a second leg 36 spaced apart by a central portion 38. The legs 34, 36 include bores 40 for receiving a pin or bolt 42. The bolt 42 has a first end 44 and a second end 46. The second end 46 in the illustrated embodiment includes a stop or flange 48. The first end 44 is adapted to receive a padlock body 50. It should be noted that while the bolt 42 is illustrated as being straight and including the flange 48, it is within the scope of the present invention to have the bolt 42 contain a bend near the second end 46 sufficient to prevent the pin 42 from being removed during use.

The handle portion 20 is located adjacent the second end 30 of the body portion 16. The handle portion 20 may, as best illustrated in FIGS. 2 and 4, take the shape of a short piece of tubing having an inner diameter which is slightly greater than an outer diameter of the body portion 16. Additionally, the handle portion 20 may simply be a portion of the third section 26 of the body portion 16. Further still, the handle portion 20 may be coupled with the body portion 16 in a manner which permits the handle portion 20 to freely rotate about a portion of the body portion 16 during use.

The locking portion 14 is preferably a projection or tang 52 that extends from the crank portion 12. The locking portion 14 has a proximal end 54 and a distal end 56. The locking portion 14 is preferably a short piece of pipe or tubing which thereby provides a passage 58 there through. The locking portion 14 is preferably coupled at its proximal end 54 to the second section 24 of the crank portion 12 as illustrated in FIG. 2. Additionally, the locking portion 14 is preferably coupled to the crank portion 12 such that the locking portion is generally perpendicular to a plane which would contain the crank portion 12. As illustrated in FIG. 2, the locking portion 14 is preferably also coupled with the crank portion 12 in a manner in which a longitudinal axis of the tang 52 aligns radially with the body portion 16. The locking portion 14 also includes a through bore 60 that is generally radial with respect to the tang 52. The through bore 60 is of a diameter large enough to receive the bolt 42 but smaller than the stop 48.

Figure 6:
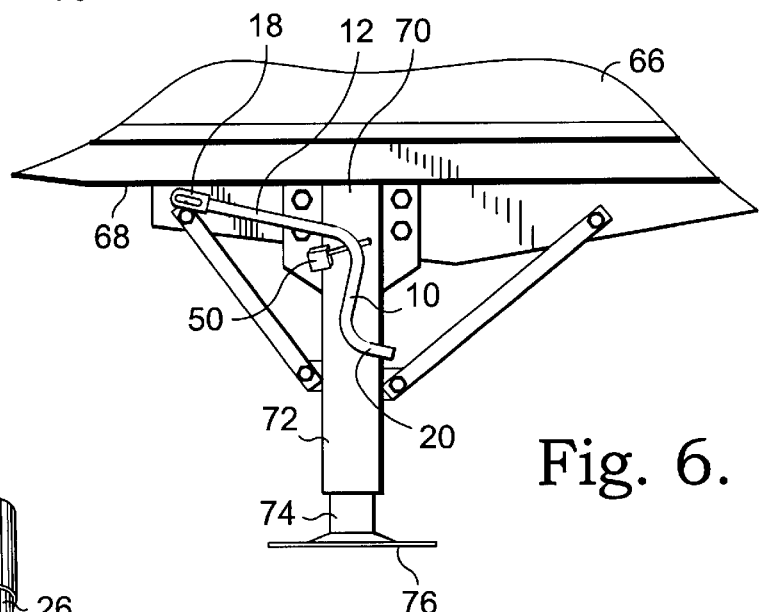
FIG. 6 is a side view of the combined trailer crank and locking mechanism of the present invention attached to the trailer in the locking position and abutting the underneath side of the trailer.
Figure 7:
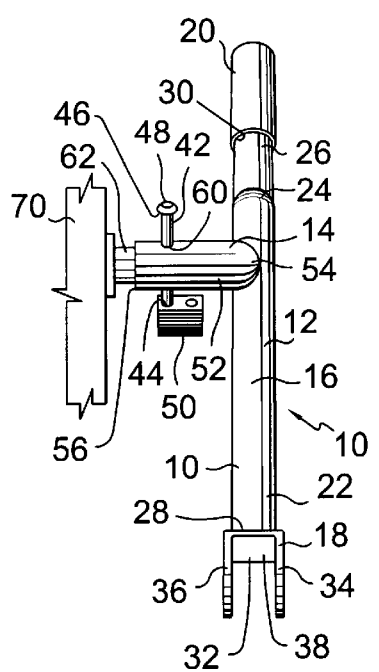
FIG. 7 is a top view of the combined trailer crank and locking mechanism of the present invention coupled with the trailer in the locking position.

In use, the device 10 may be used as a crank when attached in a cranking position as illustrated in FIGS. 1, 3, and 4 or as a lock when attached in a locking position as illustrated in FIGS. 5, 6, and 7. In the cranking position, the device 10 is coupled to a rotatable shaft 62 which extends from a support leg assembly 64 of a trailer 66 having an underneath side 68. The support leg assembly 64 includes at least one support leg 70 which has a fixed portion 72 and a movable portion 74 which cooperate in a telescoping fashion. The movable portion 74 of the support leg 70 is illustrated as terminating in a sand shoe 76.

When the rotatable shaft 62 is rotated in a first direction, the movable portion 74 of the support leg 70 is lowered and the sand shoe 76 moves away from the underneath side 68 of the trailer 66. This permits a user to raise a front end 78 of the trailer 66 to detach it from a semi-truck. Additionally, the support leg 70 permits the trailer to stand on its own without being coupled to a semi-truck.

When the rotatable shaft 62 is rotated in a second direction which is opposite the first direction, the movable portion 74 of the support leg 70 is retracted into the fixed portion 72. This permits a user to raise the sand shoe 76 off the ground surface so the sand shoe will not contact the ground when the trailer is being pulled by the semi-truck.

When the device 10 is coupled with the rotatable shaft 62 in the crank position illustrated in FIGS. 1, 3, and 4, the user may freely raise and lower the front end 78 of trailer 66 by rotating the rotatable shaft 62 through turning or "cranking" the crank portion 12 of the device 10.

After the user has coupled or uncoupled the trailer 66 to the semi-truck, the user may lock the rotatable shaft 62 in a desired position so that another person can not raise or lower the trailer 66 by moving the movable portion 74 in or out of the fixed portion 72 by attaching the device in the locking position. In this manner, the user of the device 10 can prevent theft of a trailer that is not coupled to a semi-truck by locking the support leg 70 in an extended position and/or prevent accidental damage to the support leg 70 while the trailer is pulled by locking the support leg 70 in a retracted position.

To switch from the cranking position illustrated in FIGS. 1, 3, and 4 to the locking position illustrated in FIGS. 5, 6, and 7, the user, after positioning the sand shoe 76 the desired distance away from the underneath side 68 of the trailer 66, first removes the pin 42 from the coupler portion 18 and the rotatable shaft 62. Once the pin is removed, the user may rotate the device 10 until the locking portion 14 aligns with the rotatable shaft 62. The device 10 is placed back onto the rotatable shaft 62 by way of the passage 58 receiving a portion of the rotatable shaft 52. The pin 42 is then received in the through bore 60 such that the pin extends both through the through bore 60 and the rotatable shaft 62 thereby preventing the device from being pulled off of the rotatable shaft 62. To prevent someone from removing the pin 42 from the trough bore 60, the padlock body 50 is attached to the first end 44 of the pin 42.

When the trailer is not attached to a semi-truck and the device 10 is coupled with the trailer 66 in its locking position, the device prevents someone from stealing the trailer in a number of ways. First, the would-be thief cannot raise or lower the front end 78 of the trailer to facilitate coupling the trailer to their semi-truck because the device 10 prevents them from attaching a crank of their own to the rotatable shaft. Second, even though the device 10 is coupled with the rotatable shaft 62, the device limits rotation of the rotatable shaft 62. In other words, because the crank portion 12 extends generally perpendicular from the locking portion 14, when a would-be thief attempts to rotate the rotatable shaft 62 the crank portion 12 will abut the underneath side 68 of the trailer 66 and thereby prevent the would-be thief from rotating the rotatable shaft a full rotation. As illustrated in FIG. 6, when someone attempts to rotate the device 10 when coupled with the rotatable shaft 62 in the locking position, the coupler portion 18 contacts the underneath side 68 of the trailer and it prevents the crank portion 12 from continuing to rotate about the rotatable shaft 62.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A combined trailer crank and locking mechanism device for use with a trailer of a semi-truck, the trailer having retractable legs that are operated by a rotatable shaft, the device comprising:

a crank portion having first and second ends, a handle portion, a body portion and a coupler portion, wherein the handle portion and the coupler portion are connected by the body portion, wherein the body portion is generally S-shaped, wherein the handle portion is adjacent the second end and the coupler portion is adjacent the first end, and wherein the coupler portion facilitates coupling the device to the rotatable shaft of the trailer for use as a crank; and a locking portion having a proximal end and a distal end, wherein the proximal end is connected to the crank portion, wherein the distal end facilitates coupling the device to the rotatable shaft of the trailer for use as a lock, and wherein the device prevents rotation of the rotatable shaft when used as a lock.

2. The device of claim 1, wherein the body portion and the locking portion are generally tubular in nature, wherein the coupler portion is generally a clevis, and wherein the locking portion is connected to the body portion.

3. The device of claim 2, wherein the coupler portion, the handle portion and the locking portion each have a longitudinal axis, wherein the longitudinal axis of the coupler portion and the handle portion are generally parallel to each other, and wherein the longitudinal axis of the locking portion is generally perpendicular to a plane that contains the longitudinal axises of the coupler portion and the handle portion.

4. The device of claim 3, wherein the distal end of the locking portion includes a passage for receiving a portion of the rotatable shaft of the trailer and wherein the locking portion has a transverse bore there trough.

5. The device of claim 4, wherein the locking portion extends generally radially outwardly from the body portion.

6. The device of claim 5, wherein the coupler portion has first and second legs with bores there through, wherein the bore in the locking portion and the bores in the legs of the coupler portion selectively receive a pin there through for facilitating coupling of the device to the rotatable shaft of the trailer for use as a crank or a lock.

* * * * *